US012287888B2

(12) United States Patent
Kilic et al.

(10) Patent No.: US 12,287,888 B2
(45) Date of Patent: Apr. 29, 2025

(54) DATA ENCRYPTION METHOD

(71) Applicant: ILG Exam360, LLC, Jefferson City, MO (US)

(72) Inventors: Can Kilic, Ankara (AR); Mustafa Demiraslan, Ankara (AR); Mustafa Andac Gozukan, Ankara (AR); Cenk Akin, Ankara (AR)

(73) Assignee: ILG EXAM360, LLC, Jefferson City, MO (US)

( * ) Notice: Subject to any disclaimer, the term of this patent is extended or adjusted under 35 U.S.C. 154(b) by 203 days.

(21) Appl. No.: 18/343,020

(22) Filed: Jun. 28, 2023

(65) Prior Publication Data

US 2024/0028749 A1   Jan. 25, 2024

Related U.S. Application Data

(60) Provisional application No. 63/391,410, filed on Jul. 22, 2022.

(51) Int. Cl.
*G06F 21/60* (2013.01)
*G06F 21/36* (2013.01)
*G06F 21/62* (2013.01)

(52) U.S. Cl.
CPC ............ *G06F 21/602* (2013.01); *G06F 21/36* (2013.01); *G06F 21/6209* (2013.01)

(58) Field of Classification Search
CPC ..... G06F 21/602; G06F 21/36; G06F 21/6209
See application file for complete search history.

(56) References Cited

U.S. PATENT DOCUMENTS

| | | | | |
|---|---|---|---|---|
| 8,600,050 B1* | 12/2013 | Ye | ......... | H04L 63/0428 |
| | | | | 713/160 |
| 8,806,567 B1* | 8/2014 | Venable, Sr. | ......... | H04W 12/06 |
| | | | | 340/8.1 |
| 10,154,021 B1* | 12/2018 | Lerner | ......... | H04L 9/32 |
| 10,268,832 B1* | 4/2019 | Ciubotariu | ............ | H04L 63/123 |
| 2003/0070077 A1* | 4/2003 | Redlich | .................. | H04L 9/085 |
| | | | | 713/182 |
| 2004/0049687 A1* | 3/2004 | Orsini | ................... | H04L 63/105 |
| | | | | 713/189 |
| 2007/0201693 A1* | 8/2007 | Ohno | ............... | H04N 21/44008 |
| | | | | 348/E7.056 |
| 2010/0094921 A1* | 4/2010 | Roy | ......... | G06F 15/16 |
| | | | | 709/201 |
| 2013/0024685 A1* | 1/2013 | Kolavennu | ......... | H04L 41/0806 |
| | | | | 713/153 |
| 2013/0268931 A1* | 10/2013 | O'Hare | ................... | G06F 9/485 |
| | | | | 718/1 |
| 2015/0294118 A1* | 10/2015 | Parker | ................ | H04L 63/0428 |
| | | | | 726/26 |

(Continued)

*Primary Examiner* — Vance M Little
(74) *Attorney, Agent, or Firm* — Smith Gambrell & Russell LLP

(57) ABSTRACT

A data encryption method. At a server the original data file is encrypted using an encryption key to create an encrypted data file, data is removed from the encrypted data file to create an altered encryption data file, the altered encrypted data file is transmitted to a remote computer, a QR code is created including the removed data and the encryption key, and the QR code is transmitted to the remote computer. At the remote computer, the removed data and the encryption key are recovered from the QR code and are used to recover the original data file.

1 Claim, 1 Drawing Sheet

(56) References Cited

U.S. PATENT DOCUMENTS

2020/0004930 A1* 1/2020 Myman .............. G06F 21/6209
2021/0034780 A1* 2/2021 Yurusov .............. G06F 21/6245
2022/0150228 A1* 5/2022 Speak ................... H04L 63/083

* cited by examiner

DATA ENCRYPTION METHOD

CLAIM OF PRIORITY

This application claims priority from U.S. Provisional Patent Application Ser. No. 63/391,410, filed Jul. 22, 2022, which is incorporated herein in its entirety.

FIELD OF THE INVENTION

This invention generally relates to a method for using QR codes to decrypt an encrypted text or data file that resides on a remote computer. A QR code containing a passcode key is captured at the remote computer via a web camera or hand scanner.

BACKGROUND OF THE INVENTION

Where a highly sensitive data file resides on a remote computer, the data file needs to be protected before and after a certain period of time and needs to be decrypted before it can be used for that period of time.

SUMMARY OF THE INVENTION

The present invention addresses the need for data encryption method that secures sensitive data in a data file on a remote computer. Particularly, the sensitive data file will be put on the remote computer during the installation of the software of the present invention and will remain in a binary encrypted file on the remote computer. The initial encryption will be done using 256 bit AES key. In addition to using a high-grade encryption key, parts of the encrypted data will be removed from the data file that is transferred to the remote computer as described below:

Further objects, features and advantages will become apparent upon consideration of the following detailed description of the invention when taken in conjunction with the drawings and the appended claims.

BRIEF DESCRIPTION OF THE DRAWINGS

FIG. 1 is a QR code diagram in accordance with the present invention.

DETAILED DESCRIPTION OF THE PREFERRED EMBODIMENTS

Sensitive data downloaded from a server to a remote computer is secured on the remote computer by the data encryption method of the present invention. The method secures the sensitive data in an altered encrypted data file on the remote computer until it is unlocked for use. After use of the sensitive data on the remote computer, the method again secures the sensitive data on the remote computer. In order to secure the sensitive data on a remote computer, the data encryption method of the present invention employs the following steps.

Step 1

Table 1 below illustrates a sample of plain text as a representative sample of a sensitive data file:

TABLE 1

Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.

Step 2

Table 2 below illustrates the encrypted data file using AES 256 Bit Encryption and the resulting encryption key resulting from encrypting the text in Table 1.

TABLE 2

416C1C50526068AE236A13DF0DA45BAD082D77FB67953185D771A894353F749F78E16775
032A93F3254CCB655B29123EDD8746A4A6CD5D619188F44D065BD531D57411C55679D9E
A97EDCCC97E5C0DE33FF29F9ACC57779A91DB74E1363B02505F240685F70A938EAD105BF
80829ED408D08CD6ED91F725D7DBE53415EC03EC8D298F43562F3E95A10AB24C3F85D94
61C4A776820289F8D90CD6D876C383BFEF95ACBA30204B4F9DC486AF42B4B40F58B35365
1BC29CD1A45B2CBB5164F125E3BF6B91A472D1EBC5A3730E53648CA68AEA10C05F287C19
5A6A1CDC72A1BCE4CA599E92C0420D1F2BA10ADEA481A26DC41D32E73F50DA1CB9465A
475C4342B134E86265CB5EF21C8BAA364F70EB20BBE8BFE1D91C875EBB83C1D04E38F8D6
802D85740125B4EE67FB0C1CA736EA988CC559154CC40E64BF9768C8D94385D5FF79F4DA
688516A432B28535F1833450FD9F1E43E2FBF3A974C48ECFF5B7B0296E3DE116499AB2FF0
825A9E13F7C20A2FD10B11793A0DF61FF9AEFD794232F2A2CB49002B8E6B8DF5A3B82EC1
A79C749DB804EBE13638544AFCCAA4E1EB10CEDFE76AEE587FF7322688E6A4F535321E141
406899D6929ECEF0F5866F0DB721FE1F7F

Encryption Key: 7NqjZzWznMRfjQjVz4JWMZrtxBWDH87m

Step 3

As shown in Table 3 below, data from the encrypted data file (Table 2) is removed (shown by bolded characters) using some predetermined procedure such as removing 4 characters every 80 characters or generically removing x characters every y characters.

TABLE 3

416C1C50526068AE236A13DF0DA45BAD082D77FB67953185D771A894353F749F78E16775
032A93F3254CCB655B29123EDD8746A4A6CD5D619188F44D065BD531D57411C55679D9E
A97EDCCC97E5C0DE33FF29F9ACC57779A91DB74E1363B02505F240685F70A938EAD105BF
80829ED408D08CD6ED91F725D7DBE53415EC03EC8D298F43562F3E95A10AB24C3F85D94
61C4A776820289F8D90CD6D876C383BFEF95ACBA30204B4F9DC486AF42B4B40F58B35365
1BC29CD1A45B2CBB5164F125E3BF6B91A472D1EBC5A3730E53648CA68AEA10C05F287C19
5A6A1CDC72A1BCE4CA599E92C0420D1F2BA10ADEA481A26DC41D32E73F50DA1CB9465A
475C4342B134E86265CB5EF21C8BAA364F70EB20BBE8BFE1D91C875EBB83C1D04E38F8D6
802D85740125B4EE67FB0C1CA736EA988CC559154CC40E64BF9768C8D94385D5FF79F4DA
688516A432B28535F1833450FD9F1E43E2FBF3A974C48ECFF5B7B0296E3DE116499AB2FF0
825A9E13F7C20A2FD10B11793A0DF61FF9AEFD794232F2A2CB49002B8E6B8DF5A3B82EC1
A79C749DB804EBE13638544AFCCAA4E1EB10CEDFE76AEE587FF7322688E6A4F535321E141
406899D6929ECEF0F5866F0DB721FE1F7F

Total: 896 characters.

Step 4

Table 4 below shows the removed data characters from the encrypted data file (Table 3).

TABLE 4

A93FC0DEF7253BFE1EBC26DCEBB85FF7F0829DB8EF0F

Step 5

Table 5 below shows an altered encrypted data file with the data characters removed from the encrypted data file of Table 3. The altered encrypted data file is sent to the remote computer.

TABLE 5

416C1C50526068AE236A13DF0DA45BAD082D77FB67953185D771A894353F749F78E16775
0323254CCB655B29123EDD8746A4A6CD5D619188F44D065BD531D57411C55679D9EA97E
DCCC97E533FF29F9ACC57779A91DB74E1363B02505F240685F70A938EAD105BF80829ED4
08D08CD6ED91D7DBE53415EC03EC8D298F43562F3E95A10AB24C3F85D9461C4A7768202
89F8D90CD6D876C38F95ACBA30204B4F9DC486AF42B4B40F58B353651BC29CD1A45B2CB
B5164F125E3BF6B91A472D5A3730E53648CA68AEA10C05F287C195A6A1CDC72A1BCE4CA5
99E92C0420D1F2BA10ADEA481A41D32E73F50DA1CB9465A475C4342B134E86265CB5EF21
C8BAA364F70EB20BBE8BFE1D91C8753C1D04E38F8D6802D85740125B4EE67FB0C1CA736E
A988CC559154CC40E64BF9768C8D94385D9F4DA688516A432B28535F1833450FD9F1E43E
2FBF3A974C48ECFF5B7B0296E3DE116499AB2F5A9E13F7C20A2FD10B11793A0DF61FF9AEF
D794232F2A2CB49002B8E6B8DF5A3B82EC1A79C7404EBE13638544AFCCAA4E1EB10CEDFE
76AEE587FF7322688E6A4F535321E141406899D6929EC5866F0DB721FE1F7F

Total: 852 chars.

Step 6

The server prepares a QR code that includes the decryption key and the removed data characters (FIG. 1).

Decryption Key: - - - 7NqjZzWznMRfiQjVz4JVVMZrtxBWDH87m

Removed Data Characters: - - - A93FCODEF7253BFE1EBC26DCEBB85FF7F0829DB8EFOF

Once the QR code has been prepared to include the decryption key and the removed data characters, the QR code is transmitted to the remote computer.

Step 7

At the remote computer, steps from 4 to 1 are reversed in order to decrypt the data from the altered encrypted data file. The remote computer captures the data in the QR code either by webcam or scanner. In a reversal of step 3, the missing data characters are then added back into the altered encrypted data file to re-create the encrypted data file. In a reversal of step 2, the encryption key is used to decrypt the data in the encrypted data file to re-create the original data file.

When required, the data in the QR code will be transferred to the remote computer's built-in web camera. If no webcam is present a USB Hand QR Code Scanner can be used to recover the QR code.

The data remaining on the remote computer will be missing enough bytes which will render it useless and safe from brute-force attacks or even in the event that the decryption key is lost.

While this invention has been described with reference to preferred embodiments thereof, it is to be understood that variations and modifications can be affected within the spirit and scope of the invention as described herein and as described in the appended claims.

We claim:

1. Data encryption method comprising the steps of:
   a. at a server:
      i. encrypting an original data file with an encryption key to create an encrypted data file;
      ii. from the encrypted data file removing x number of data characters every y number of data characters to create an altered encrypted data file;
      iii. capturing the removed data characters;
      iv. sending the altered encrypted data file to a remote computer;
      v. creating a QR code representing the encryption key and the removed data characters; and
      vi. sending the QR code to the remote computer, and
   b. at the remote computer:
      i. capturing and decoding the QR code at the remote computer to recover the removed data characters and the encryption key;
      ii. adding the removed data characters back into the altered encrypted data file to re-create the encrypted data file; and
      iii. decrypting the encrypted data file using the recovered encryption key to re-create the original data file.

* * * * *